Patented May 27, 1952

2,598,170

UNITED STATES PATENT OFFICE 2,598,170

PROCESS OF SEALING STEEL STORAGE VESSELS

Earl E. Huebotter, Tulsa, Okla., assignor to National Lead Company, Tulsa, Okla., a corporation of New Jersey No Drawing. Application March 11, 1946, Serial No. 653,704

2 Claims. (Cl. 117—95)

This invention relates to storage vessels or containers adapted particularly for the storage of salt water.

In many cases it is necessary or desirable to store salt water; thus in various oil fields of the United States the production of oil is accompanied with considerable salt water and the latter usually presents a disposal problem. If the salt water be drained off into streams and rivers it is liable to be destructive to fish and vegetation. Storage of salt water particularly in oil fields is usually done in earthen ponds, lakes or tanks. Occasionally an old steel oil storage tank is set on the ground even if its bottom is not water-tight or even if it is rusted out. The salt water is, however, liable to leak out and affect the neighboring land or subterranean water courses. Even if the ground bottom is clay, salt water acts to flocculate the clay so that the water will pass therethrough.

One of the objects of this invention, therefore, is to provide method and means whereby a sealed container for salt water is attained.

Further objects will appear from the detailed description which will set forth a number of embodiments of this invention; it is to be understood, however, that this invention is susceptible of various embodiments within the scope of the appended claims.

Generally stated and in accordance with illustrative embodiments of this invention, a storage container or vessel for salt water is sealed by treatment with a gelatinized polysaccharose without or with a clay and more particularly a clay which is not readily flocculated by salt water. The gelatinized polysaccharose may be of a group consisting of gelatinized starches, gums and sea weeds. The starches may be produced from any starch base such as corn, the grains or the legumes and suitably gelatinized as by cooking in water without or with an alkali such as caustic soda. The gums may be various ones such as gum arabic, gum karaya, the sea weeds, maybe Irish moss, agar agar, etc. All of the gelatinized polysaccharoses are vegetable emulsoidcolloids in that they swell in water, form a gel therein and are noncorrosive to steel. The clay used may be a fuller's earth of the Georgia-Florida type which is not readily flocculated by salt water and is also noncorrosive to steel.

In the procedure of preparing or sealing a container the bottom may be provided with a layer of a gelatinized polysaccharose or with a mixture of a gelatinized polysaccharose and the clay where the bottom is already an earthen one or the container has also earthen sides the material may be applied to the bottom or also to the sides and compacted. If salt water is then run into the container the material will form a gelatinous mass which will form a water seal. Where the container is already filled or partially filled with salt water, the material may be simply run into the salt water forming a gelatinous suspension therein, although it will first drain into the bottom or sides and will quickly seal the same so as to prevent further outflow. Even where the container is a metal tank any rusting of the bottom or sides will cause the gelatinous suspension to flow into the earth below or surrounding it so as to again quickly seal the outlet to the salt water. In view of the fact that gelatinized starches tend to ferment it may be desirable to add a preservative such as formaldehyde. If, however, the salt solution is fairly concentrated such preservative may not be necessary, moreover the fermentation may be prevented by the addition of an alkali such as caustic soda or lime.

This invention, therefore, provides means for effectively sealing a storage container for salt water in a simple and effective manner.

Having thus described the invention, what is claimed is:

1. The process of sealing steel storage vessels containing salt water comprising, introducing into the container and dispersing into the salt water therein, sufficient of a gelatinized polysaccharose selected from the group consisting of gelatinized starches, gums and sea-weeds and of a type dispersible, swelling in and forming a gel in salt water but noncorrosive to steel, so as to seal the vessel against leakage of salt water therefrom.

2. The process of sealing steel storage vessels containing salt water comprising, introducing into the container and dispersing into the salt water therein sufficient of a gelatinized polysaccharose selected from the group consisting of gelatinized starches, gums and sea-weeds and of a type dispersible, swelling in and forming a gel in salt water but noncorrosive to steel, and sufficient of a fuller's earth of the Georgia-Florida type and not readily flocculated by salt water and also noncorrosive to steel, so as to seal the vessel against leakage of salt water therefrom.

EARL E. HUEBOTTER.

REFERENCES CITED

The following references are of record in the file of this patent:

UNITED STATES PATENTS

| Number | Name | Date |
|---|---|---|
| 168,269 | Matthews | Sept. 28, 1875 |
| 1,763,105 | Slinger | June 10, 1930 |
| 1,973,910 | Peterson | Sept. 18, 1934 |
| 2,104,488 | Kennedy et al. | Jan. 4, 1938 |
| 2,212,557 | Bauer | Aug. 27, 1940 |
| 2,221,261 | Lenhard | Nov. 12, 1940 |
| 2,300,325 | Van Leeuwen | Oct. 27, 1942 |
| 2,317,730 | Calvert | Apr. 27, 1943 |
| 2,444,154 | Cross | June 29, 1948 |